United States Patent
Kuehner et al.

(10) Patent No.: US 12,351,129 B2
(45) Date of Patent: Jul. 8, 2025

(54) SYSTEMS AND METHODS TO UTILIZE USER TRAJECTORY ANALYSIS FOR AUTOMATIC VEHICLE CONTROLS

(71) Applicant: TOYOTA RESEARCH INSTITUTE, INC., Los Altos, CA (US)

(72) Inventors: Manuel Ludwig Kuehner, Mountain View, CA (US); Hiroshi Yasuda, San Francisco, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 166 days.

(21) Appl. No.: 17/728,484

(22) Filed: Apr. 25, 2022

(65) Prior Publication Data
US 2023/0339431 A1 Oct. 26, 2023

(51) Int. Cl.
*B60R 25/24* (2013.01)
*B60R 25/30* (2013.01)
(Continued)

(52) U.S. Cl.
CPC .......... *B60R 25/245* (2013.01); *B60R 25/305* (2013.01); *B60R 25/31* (2013.01);
(Continued)

(58) Field of Classification Search
CPC ..... B60R 25/245; B60R 25/305; B60R 25/31; G06T 7/20; G06T 2207/20081;
(Continued)

(56) References Cited

U.S. PATENT DOCUMENTS 6,075,454 A 6/2000 Yamasaki
8,314,680 B2 11/2012 Ichihara
(Continued)

FOREIGN PATENT DOCUMENTS

CN 110386105 B 5/2021
JP 2020100963 A 7/2020
KR 20200033170 A * 3/2020

OTHER PUBLICATIONS

Yang et al., "An Intelligent Automated Door Control System Based on a Smart Camera," Sensors 13(5):5923-5936, May 10, 2013 (https://doi.org/10.3390/s130505923).

*Primary Examiner* — Curtis A Kuntz
*Assistant Examiner* — James E Munion
(74) *Attorney, Agent, or Firm* — SHEPPARD, MULLIN, RICHTER & HAMPTON LLP; Daniel N. Yannuzzi

(57) ABSTRACT

A system is provided for implementing trajectory analysis entry controls. A trajectory analysis entry control system is implemented in a vehicle, and supports remote and automatic entry control functions for the vehicle. For example the system triggers various automatic entry controls functions, such as remotely unlocking doors and/or a trunk of a vehicle, by tracking and analyzing a user's trajectory of movement while they are approaching the vehicle. A system includes a user identification device to identify whether a user is authorized to access the vehicle, such as a driver. The system also includes a trajectory tracking device that determines a trajectory of the user with respect to the vehicle. As the user's trajectory is determined to be approaching the vehicle, the trajectory tracking device further determines which entry point of the vehicle the user is approaching and automatically engages an automatic unlocking of that access point of the vehicle.

20 Claims, 8 Drawing Sheets

(51) Int. Cl.
*B60R 25/31* (2013.01)
*G06T 7/20* (2017.01)
*G06V 20/56* (2022.01)
*G06V 40/16* (2022.01)
*H04B 1/7163* (2011.01)

(52) U.S. Cl.
CPC ............... *G06T 7/20* (2013.01); *G06V 20/56* (2022.01); *G06V 40/172* (2022.01); *H04B 1/7163* (2013.01); *G06T 2207/20081* (2013.01); *G06T 2207/30196* (2013.01); *G06T 2207/30241* (2013.01); *G06T 2207/30252* (2013.01)

(58) Field of Classification Search
CPC . G06T 2207/30196; G06T 2207/30241; G06T 2207/30252; G06V 20/56; G06V 40/172; H04B 1/7163
See application file for complete search history.

(56) References Cited

U.S. PATENT DOCUMENTS

| | | | |
|---|---|---|---|
| 8,930,045 B2 | 1/2015 | Oman | |
| 9,514,587 B2 | 12/2016 | Kishita | |
| 9,803,391 B2 | 10/2017 | Banvait | |
| 9,816,308 B2 | 11/2017 | Myers | |
| 9,963,107 B2 | 5/2018 | Murar | |
| 10,179,568 B2 | 1/2019 | Hariri | |
| 10,285,013 B2 | 5/2019 | Ledvina | |
| 10,308,223 B2 | 6/2019 | Tani | |
| 10,328,900 B1 | 6/2019 | Yakovenko | |
| 10,384,641 B2 * | 8/2019 | McNabb | B60R 25/01 |
| 10,713,502 B2 | 7/2020 | Tiziani | |
| 10,717,413 B2 | 7/2020 | Lane | |
| 10,775,493 B2 | 9/2020 | Santra | |
| 10,850,709 B1 * | 12/2020 | Nagata | G07C 9/00563 |
| 10,882,493 B2 * | 1/2021 | Foster | G06Q 20/3224 |
| 11,205,314 B2 * | 12/2021 | Venetianer | G06F 16/285 |
| 2002/0097145 A1 | 7/2002 | Tumey | |
| 2015/0284984 A1 | 10/2015 | Kanter | |
| 2016/0300410 A1 | 10/2016 | Jones | |
| 2019/0044952 A1 * | 2/2019 | Jacobs | H04L 67/535 |
| 2019/0176737 A1 | 6/2019 | Watanabe | |
| 2019/0384303 A1 | 12/2019 | Muller | |
| 2020/0238952 A1 * | 7/2020 | Lindsay | G06V 30/194 |
| 2021/0241551 A1 | 8/2021 | Loeshelle | |
| 2022/0012968 A1 | 1/2022 | Hartman | |

* cited by examiner

SYSTEMS AND METHODS TO UTILIZE USER TRAJECTORY ANALYSIS FOR AUTOMATIC VEHICLE CONTROLS

TECHNICAL FIELD

The present disclosure relates generally to automatic vehicle entry technology. In particular, various embodiments describe a vehicle that includes the capability to utilize user trajectory analysis to provide keyless automatic vehicle entry, such as a keyless door unlock, as an enhanced control feature.

DESCRIPTION OF RELATED ART

Many vehicles are equipped with various automatic control features relating to the vehicle's security system (e.g., alarms) and entry/access systems (e.g., doors, locks), and ignition system that provide added convenience to drivers. Some vehicles have keyless entry systems that allow a driver to automatically unlock and/or lock the doors of the vehicle without physically inserting their key.

In most instances, keyless entry systems function remotely, where the vehicle's doors are automatically unlocked/locked even while the driver is at a distance (e.g., within a range of 60 feet) away from the vehicle. For example, a keyless entry system utilizes a short-range radio frequency (RF) transmitter integrated into the key. Thus, the driver can use the transmitter/key to remotely communicate control signals, via RF, to a module/receiver that activates the automatic unlocking/locking of the door(s) in the vehicle.

BRIEF SUMMARY OF THE DISCLOSURE

In accordance with embodiments of the disclosed technology, methods, and systems for remote and automatic entry controls, which are based on trajectory analysis of the users, are implemented in a vehicle. In an embodiment, a system, comprises a user identification device configured to identify whether a user within a distance range from the vehicle is authorized to access the vehicle. The system also comprising a trajectory tracking device. The trajectory tracking device configured to determine whether the trajectory of the user is approaching the vehicle. In response to determining that the trajectory of the user is approaching the vehicle, the trajectory tracking device determines which defined access point of the vehicle the trajectory of the user is approaching and automatically generates a control signal to engage an automatic unlocking of the determined access point of the vehicle.

In another embodiment, a system comprises a user identification device configured to identify whether a user within a distance range from the vehicle is authorized to access the vehicle. Further, in response to the identified user being authorized to access the vehicle, the user identification device determines whether an additional user is within a distance range from the authorized user. The system also include a trajectory tracking device. The trajectory tracking device is configured to determine a trajectory of the user with respect to the vehicle. Also, the trajectory tracking device determines a trajectory of the additional user with respect to the vehicle, and determines a proximity distance between the user and the additional user. Then, the trajectory tracking device determines whether the proximity distance between the identified user and the additional user satisfies a proximity association parameter.

Additionally, the trajectory tracking device determines whether the trajectory of the identified user and the trajectory of the additional user satisfies a trajectory association parameter. The trajectory tracking device determines which defined access point of the vehicle the trajectory of the identified user is approaching, and automatically generate a control signal to engage an automatic unlocking of the determined access point of the vehicle for the identified user. Subsequently, in response to determining that the proximity association parameter is satisfied and the trajectory association parameter is satisfied, the trajectory tracking device determines that the additional user is associated with the identified user.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Some vehicles include computer-controlled features relating to the vehicle's security system (e.g., alarms), and entry/access systems (e.g., doors, locks), and ignition system that provide added convenience to drivers. Some vehicles have keyless entry systems that allow a driver to automatically unlock and/or lock the doors of the vehicle without physically inserting their key. Keyless entry to a vehicle is most commonly implemented by sending a radio frequency (RF) signal from a remote transmitter, such as an RF key FOB, to a control module/receiver that is located at the vehicle. Although these currently used RF-based keyless entry systems have some convenience, the systems still often times require additional user interactions, such as pressing a "door unlock" button on the remote key FOB or touching the handle of the door. In contrast, the systems and methods described herein enable an automatic and remote entry controls for a vehicle that are effectuated by analyzing a user's trajectory as they are moving to approach the vehicle. Thus, the disclosed embodiments provide a truly keyless entry, where remote vehicle entry is controlled without any additional user input, such as pressing a button or hand/foot gestures. For example, drivers and passengers simply walking to the vehicle will automatically trigger the disclosed system to unlock doors for entry.

Figure 1:
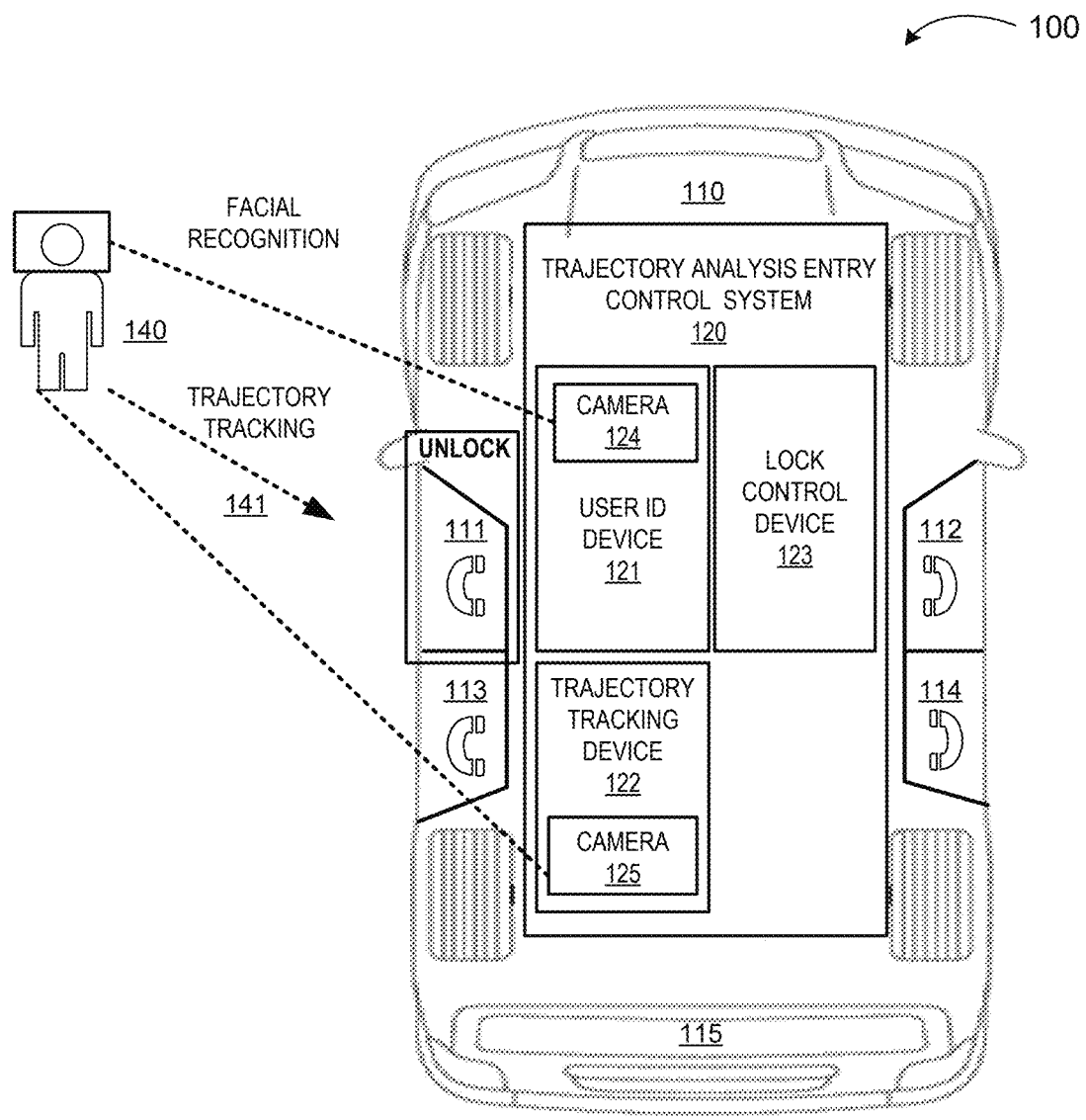
FIG. 1 is an example configuration of a trajectory analysis entry control system based on imaging technology utilized in a vehicle, in accordance with an embodiment of the technology disclosed herein.

Referring now to FIG. 1, an example environment 100 including a vehicle 110 and a person 140 that is walking proximate to the vehicle 110 is depicted, wherein the vehicle 110 is configured to implement a trajectory analysis entry control system 120 and capabilities, as disclosed herein. Subsequently, the trajectory analysis entry control system 120 uses this information to determine a trajectory of the user's 140, and, in turn, uses the determined trajectory to effectuate an automatic entry control function. For example, if the trajectory analysis entry control system 120 tracks an authorized driver's movement and determines that the driver is approaching the vehicle 110, the system 120 can trigger an automatic entry control function, such as unlocking one of the vehicle doors 111-114. The system 120 enables automatic entry functions for the vehicle 110, such as unlocking and/or locking doors, that are based on a user's 140 trajectory without requiring the user 140 to physically interact with the key in any manner (e.g., pressing button on key), and thereby provides a true keyless entry. Restated, the trajectory analysis entry control system 120 supports a fully remote and seamless automatic access/entry to the vehicle 110, for instance unlocking/opening doors 111-114 and trunk 115, by simply tracking and analyzing the user's 140 trajectory while they are already walking towards the vehicle.

For purposes of illustration, the embodiments will be described here with respect to automobiles. However, it should be appreciated that the trajectory analysis entry control features disclosed herein are not limited to automobiles. The systems and methods disclosed herein may be implemented with any of a number of different vehicles and vehicle types. For example, the trajectory analysis entry control systems and methods disclosed herein may be used with automobiles, trucks, boats, recreational vehicles, and other like on- or off-road vehicles. In addition, the principals disclosed herein may also extend to other vehicle types as well.

Since the automatic entry controls of the system 120 are based on tracking the trajectory of the user 140, unlocking/locking the vehicle's doors 111-114 and/or trunk 115 remotely is extremely convenient for the user 140. For instance, the trajectory analysis entry control system 120 does not require the user 140 to provide any additional dedicated input and/or actions in order to remotely control access to the vehicle 110, such as physically pushing an unlock/lock button on a remote key fob, touching a door handle, or even placing their foot under the rear bumper (e.g., unlocking/open trunk). In addition, the trajectory analysis entry control system 120 determines an identity of the user 140 prior to triggering any automatic entry control function for the vehicle 110, in order to ensure that the user 140 is a person that is authorized to access/enter the particular vehicle 110. As an example, the system 120 determines if a user is identified as a driver/owner of the vehicle or a passenger that is predefined as being associated with the vehicle 110, before any of the doors 111-114 and/or trunk 115 are automatically unlocked.

As seen in FIG. 1, the vehicle 110 implements the trajectory analysis entry control system 120, as disclosed herein. FIG. 1 shows an example configuration of the trajectory analysis entry control system 120, where the system 120 is comprised of several components, including: a lock control device 123 configured to communicate electro-mechanical signals to mechanisms of each of the vehicles 110 doors 111-114 and trunk 115 that are necessary to control automatic entry functions, such as automatic unlock/open and automatic lock/close functions; a user identifier (ID) device 121, which includes an image capturing device, namely camera 124, and is configured to capture/analyze visual images of a user to identify the user (e.g., facial recognition) and further determine whether the identified user has authorization to access the vehicle 110; and a trajectory tracking device 122 which includes an image capturing device, namely camera 125, and is configured to capture/analyze visual images of the identified user's movement to determine a corresponding trajectory of the user with respect to the vehicle 110, where the trajectory serves as the basis for executing (or not executing) automatic entry control functions for the vehicle 110. As used herein, a "vehicle" is any form of motorized transport. In the illustrated example, vehicle 110 is an automobile. For purposes of illustration, the embodiments will be described here with respect to automobiles. However, it should be appreciated that the trajectory analysis entry control features disclosed herein are not limited to automobiles. The systems and methods disclosed herein may be implemented with any of a number of different vehicles and vehicle types. For example, the trajectory analysis entry control systems and methods disclosed herein may be used with automobiles, trucks, boats, recreational vehicles, and other like on- or off-road vehicles. In addition, the principals disclosed herein may also extend to other vehicle types as well.

Figure 2:
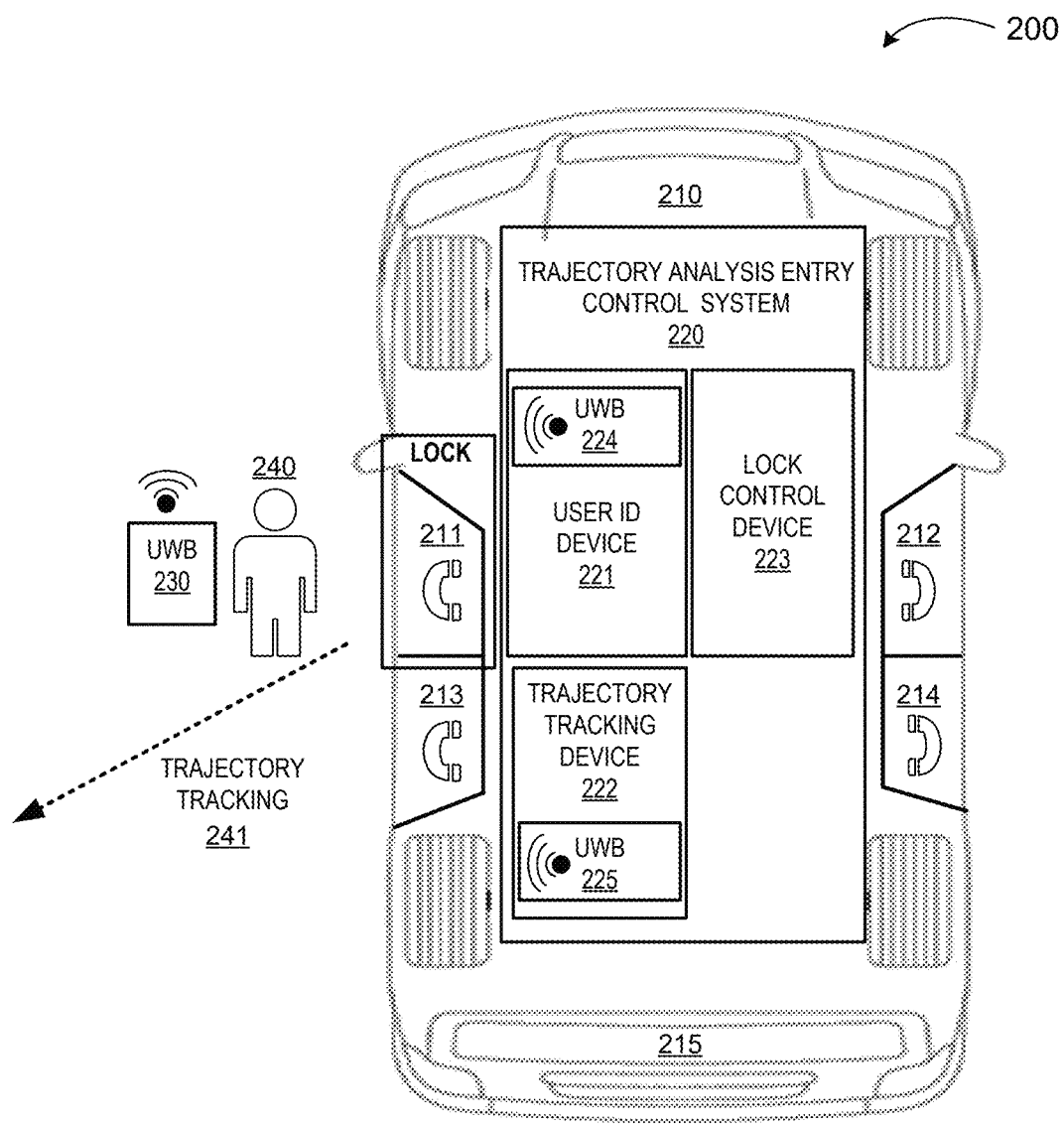
FIG. 2 is an example configuration of a trajectory analysis entry control system based on ultra-wideband (UWB) technology utilized in a vehicle, in accordance with an embodiment of the technology disclosed herein.
Figure 3:
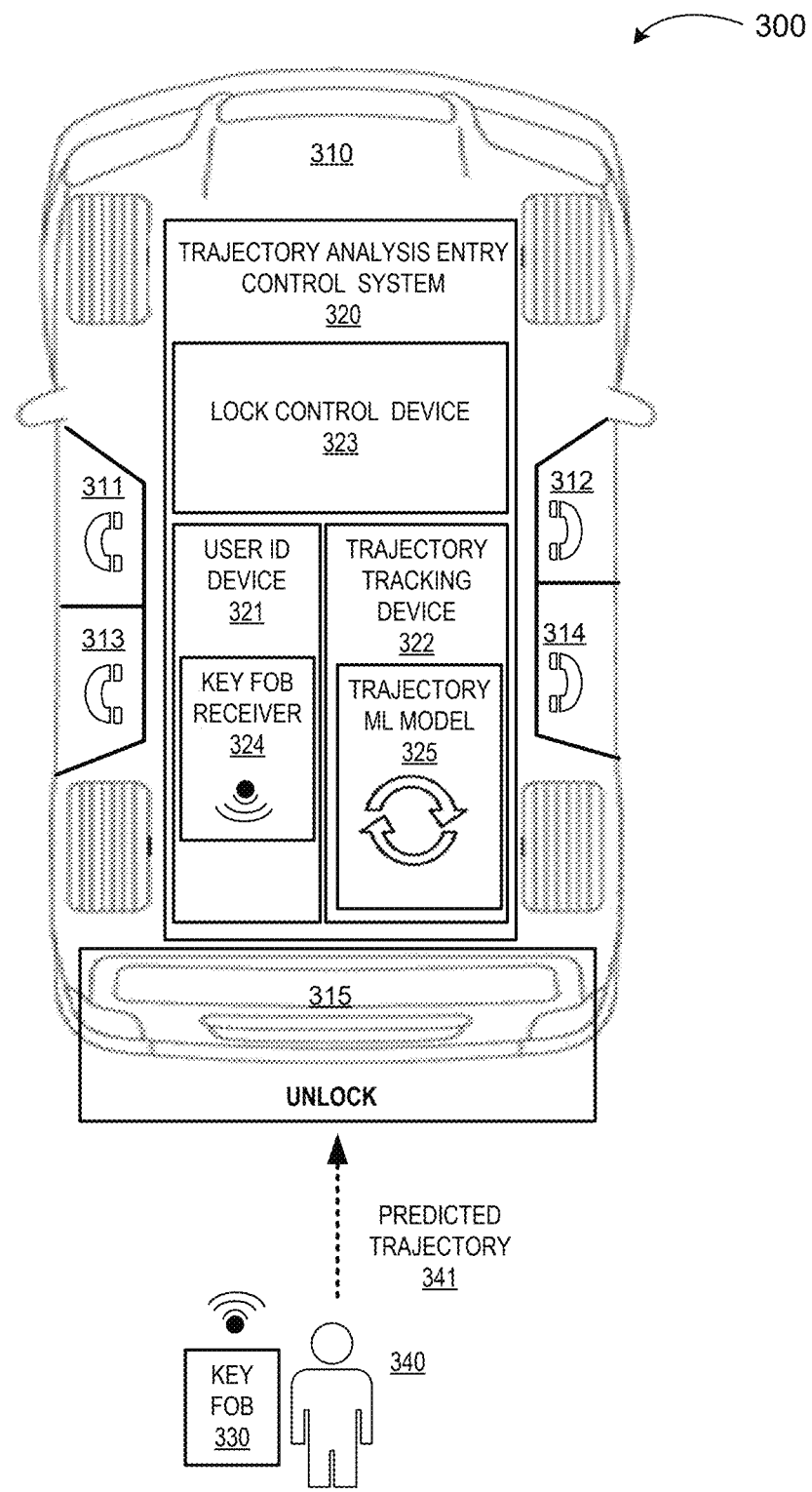
FIG. 3 is an example configuration of a trajectory analysis entry control system based on machine learning (ML) technology utilized in a vehicle, in accordance with an embodiment of the technology disclosed herein.

In the example configuration of FIG. 1, the trajectory analysis entry control system 120 includes the user ID device 121. According to an embodiment, the user ID device 121 is configured to identify whether a person that is in the proximity of the vehicle 110, such as user 140, is a defined authorized user and/or person that is assigned rights to have access/entry to the vehicle 110. In the example environment 100, the user 140 is illustrated as being approximately proximate to the vehicle 110. For example, the user 140 is within a specified distance range from the vehicle 110 in order for the identification functions of the user ID device 120 to be initiated, where the distance range is defined by the system 120. As an example, the user can be a distance from the vehicle 110 that approximately within the range of 1 ft-10 ft, where it can be logically assumed that the user 140 is close enough to the vehicle 110 to desire entry/access to the vehicle 110. By limiting the identification and trajectory tracking aspects of the system 120 to users that are within a defined distance range from the vehicle 110, it reduces the potential risk that the system 120 will unnecessarily attempt to obtain information and preform analysis related to users that are just passing-by and/or not particularly concerned with accessing the vehicle 110, thereby reducing overhead, latency, and wasted processing and/or memory resources of the vehicle 110. In alternative embodiments, the trajectory analysis entry control system 120 can initiate the identification and trajectory tracking functions upon receiving a signal from a remote device that is known to be associated with the vehicle 110, such as a corresponding remote key fob device (as shown in FIG. 3), or remote ultra-wideband (UWB) device (as shown in FIG. 2). This enables the user 140 to be a greater distance from the vehicle 110 as long as they are within the wireless communication range of the remote device, such as being up to 60 ft away from the vehicle 110, when the system 120 begins the identification and trajectory analysis actions.

As previously described, the user ID device 121 can include an image capturing device, which is shown as camera 124. The camera 124 can be a digital camera that is integrated with the vehicle 110 sensor electronics that is configured to obtain visual imaging data of the user 140 and area surrounding the vehicle 110 that may be relevant for the purposes of identification, such as video, pictures, digital images, and the like. For example, the camera 124 captures multiple digital images of the user 140 that are further analyzed by the user ID device 121 to access the user's 140 distance from the vehicle 110. The user ID device 121 may use this detected distance to determine whether the user 140 is close enough to the vehicle 110 to be considered for access/entry, for instance within a defined range from the vehicle 110.

If the user 140 is substantively close the vehicle 110 (e.g., within the defined range), then further image analysis may be performed by the user ID device 121 in order to identify the user 140. Then, the camera 124 can continue to capture image data of the user 140 that is proximate to the vehicle 110, particularly for the purpose of identification. FIG. 1 illustrates that the camera 124 obtains digital images of the user's 140 face, facial features, and the like. According to the embodiment, the user ID device 121 is configured to perform facial recognition techniques. Therefore, the user ID device 121 has the capability to analyze the image data of the user's 140 face and/or facial region that is collected by the camera 124 in order to perform facial recognition techniques and identify whether the user 140 matches a defined authorized user of the vehicle 110, such as an owner, operator, driver, etc.

For example, the user ID device 121 is programmed to perform facial recognition that involves comparing the facial features of the user 140 that are extracted from the obtained digital images to a plurality of known facial features of defined authorized users. In the case where the user's 140 face matches a face of an authorized user, the user ID device 121 considers the matching result from facial recognition as confirmation that the identity of the user 140 is a person that has access/entry rights to the vehicle 110 and one or more automatic entry functions of the system may be executed. For example, the user ID device 121 performs facial recognition on multiple digital images of user 140, and as a result confirms that the user's 140 face matches the facial characteristics of a person that is a defined driver of the vehicle 110. The verified facial recognition serves to successfully identify the user 140 as an authorized user, particularly the user 140 is identified as a driver/operator of the vehicle, and then the system 120 is enabled to potentially open one of the doors 111-114 and/or trunk 115 for the identified user 140 based on the trajectory analysis which will be performed. In contrast, if facial recognition produces no match between the face of the user 140 and at least one of the defined authorized users, then the user 140 may be considered as unidentified by the user ID device 140. An unidentified user and/or a user identity that cannot be confirmed can be determined by the user ID device 121 as a person that does not have access/entry rights to the vehicle 110, and automatic entry controls are not permitted. Although FIG. 1 illustrates the user ID device 121 utilizing facial recognition, it should be appreciated that the example is not intended to be limiting and the user ID device 121 can employ other forms of identification that can accomplished using features extracted from data obtained from a camera 124, such as audio/voice identification, iris identification, gait (e.g., walking/movement pattern) identification, fingerprint identification, biometric identification, and the like in lieu of and/or in addition to facial recognition.

The user ID device 121 can be implemented as a central processing unit (CPU), processor(s), computing device, circuitry, and/or electronic controller on the vehicle 110 which enables various functions and/or controls related to verifying and/or confirming an identity of one or more users that are within the vicinity of the vehicle 110. For instance, the user ID device 121 can be programmed with instructions for executing image analysis algorithms and facial recognition procedures. In order to support operations, the user ID device 121 can be in communication with other components of the trajectory analysis entry control system 120, as well as other system and components of the vehicle 110, such as other vehicle sensors.

In addition, FIG. 1 shows that this example configuration for the trajectory analysis entry control system 120 includes a trajectory tracking device 122. According to the embodiments, the trajectory tracking device 122 is distinctly configured to determine a trajectory that corresponds to an identified user, such as user 140, with respect to the vehicle; and subsequently determine an entry control function to be performed that is based on the user's trajectory. As referred to herein, the term trajectory describes a continued path (or direction) of movement for a person/object that is followed, as said person/object is in motion. Accordingly, the trajectory tracking device can be configured to analyze data that is particularly indicative of the movement of the user 140 with respect to the vehicle 110, such as direction, orientation, angle, distance, and other characteristics relating to movement in order to ultimately track trajectory. In an embodiment, the trajectory tracking device 122 receives a signal, or other indication, from the user ID device 121 signifying that the user 140 has been successfully identified as an authorized user of the vehicle 110. In other words, after the identity of the user 140 has been confirmed, and the user 140 has been verified as having access rights to the vehicle 110, then the trajectory tracking device 122 can begin performing trajectory analysis for the user's 140 movement and execute the corresponding trajectory-based entry control functions.

As seen in FIG. 1, the trajectory tracking device 122 includes an image capturing device, which is shown as camera 125. The camera 125 can be a digital camera that is integrated with the vehicle 110 sensor electronics that is configured to obtain visual imaging data of the user 140 and area surrounding the vehicle 110 that may be relevant for the purposes of analyzing a path of movement, or trajectory, for the user 140, such as video, pictures, digital images, and the like. In the example of FIG. 1, the camera 125 captures in real-time a successive series of digital images of the user 140 as they are walking towards the vehicle 110 (indicated by dashed arrow), where characteristics associated with this movement of the user 140 can be extracted from the images and further analyzed by the trajectory tracking device 122. The trajectory tracking device 122 is configured to perform various calculations and image analysis procedures that are suitable for quantifiably assessing several parameters of movement (e.g., speed, angle, direction, orientation, etc.) of an object within image data, in order to detect and track its corresponding trajectory. Accordingly, in the example, the trajectory tracking device 122 analyzes the real-time image data that is collected by the camera 125 to determine that the user 140 has a corresponding trajectory 141 that is approaching the vehicle 110. Further, after the trajectory 141 has been determined, the trajectory tracking device 122 can continue to dynamically track the trajectory 141 in order to detect the continued movement of the user and its trajectory. As an example, the trajectory tracking device 122, after continuing to track the user's 140 trajectory 141, can determine that the user 140 is not only approaching the vehicle 110 but is starting to move in a more upward direction which is more specifically towards the position of the driver-side door 111. As will be described in detail below, both general trajectory information (e.g., approaching the vehicle, away from the vehicle) and more specific trajectory information (e.g., approaching the trunk 115, approaching the driver-side door 111) can be utilized to trigger a corresponding automatic entry control function.

In some embodiments, the trajectory tracking device 122 can include historical trajectory data in its trajectory analysis functions, which corresponds to a particular user. Thus, identified trends and patterns in a particular user's movement and/or trajectory with respect to the vehicle can be leveraged for analysis. For instance, this can involve artificial intelligence (AI) and machine learning (ML) modeling, which is described in greater detail in reference to FIG. 3.

On a general level, when the trajectory tracking device 122 has analyzed image data obtained by the camera 125 and determines that the user 140, for instance, has a trajectory 141 that is approaching closer towards the vehicle 110 (e.g., moving in a direction towards the position of the driver-side door 111), the device 122 initiates an automatic and remote unlocking of one or more doors 111-114 and/or trunk 115 in response. Conversely, when the trajectory tracking device 122 determines that the user 140 has a trajectory that is receding farther away from the vehicle (e.g., moving in an opposite direction from the position of the vehicle 110), the device 122 can initiate an automatic and remote locking of one or more doors 111-114 and trunk 115 in response. However, in some embodiments, when the trajectory tracking device 122 determines that the user 140 is moving farther away from the vehicle (e.g., moving in an opposite direction from the position of the vehicle 110) or diverges/passes by the vehicle (e.g., distance from the vehicle initially decreases, then starts to increase), the device 122 can determine that these types of trajectories indicate that the user 140 does not intend to enter/access the vehicle 110 and thus no automatic entry function is executed (e.g., no remote locking or unlocking of the doors 111-114, trunk 115).

Furthermore, on a more granular level, the trajectory tracking device 122 can detect the user's trajectory with respect to a specific section/area of the vehicle 110 in order to trigger a more specific automatic entry control function. Through trajectory analysis, the trajectory tracking device 122 can distinguish whether the user's trajectory 141 is specifically heading towards any one of the entry/access points for the vehicle 110, illustrated as driver-side front door 111, driver-side front door 112, passenger-side front door 113, and passenger-side rear door 114. Based on the trajectory being determined to progress towards a specific entry point, the trajectory tracking device 122 can effectuate an automatic entry control for that corresponding entry point. In other words, the user's trajectory is used to estimate which one of the doors 11-14, or trunk 115 that the user is approaching, and thus, in turn, determines which of the doors 11-14, or trunk 115 that is unlocked/opened. As illustrated in FIG. 1, when the trajectory tracking device 122 determines that the trajectory 141 for the user 140 is particularly moving in the direction of the driver-side front door 111, the system 120 can automatically and remotely unlock and open the driver-side front door 111 (as the other doors 112-114 and trunk 115 remain locked).

Also, FIG. 1 shows that the trajectory analysis entry control system 120 can include a lock control device 123. The lock control device 123 can be configured to receive a control command that is determine by the trajectory tracking device 122, and in turn, communicates electro-mechanical signals conveying the command to mechanisms of the vehicle's 110 doors 111-114 and trunk 115. That is, the lock control device 123 is communicatively connected to the locking/unlocking mechanisms of each of the doors 111-114 and trunk 115 in a manner that is necessary to control automatic entry functions, such as automatic unlock/open and automatic lock/close functions. In an embodiment, the lock control device 123 can communicate to another component of the vehicle 110 that controls locking/unlocking of the doors 111-114 and trunk 115, such as a main vehicle processor. The lock control device 123 can be implemented as a central processing unit (CPU), processor(s), computing device, circuitry, and/or electronic controller on the vehicle 110 which enables various functions and/or controls related to automatic entry control functions of the vehicle 110, such as unlocking doors 111-114 or trunk 115. In order to support operations, the lock control device 123 can be in communication with other components of the trajectory analysis entry control system 120, as well as other system and components of the vehicle 110 as deemed necessary. Although the devices 121-123 of the trajectory analysis entry control system 120 are depicted as stand-alone hardware devices, it should be appreciated that the functions and structure of any combination of the aforementioned devices can be integrated into the same hardware device.

Referring back to the example of FIG. 1, the user 140 is at a distance away from the vehicle 110. The user 140 is also illustrated to have some movement (indicated by dashed arrow) in the direction towards the vehicle 110. In other words, the user 140 is depicted in FIG. 1 as having a trajectory 141 that is moving closer in proximity towards the vehicle 110 (e.g., distance from the vehicle 140 is decreasing). For instance, the user 140 can be a driver/operator of the vehicle 110 that is walking towards their car. As the driver, the user 140 would likely want to open the front driver-side door 111 upon reaching the vehicle 110, in order to enter and drive the vehicle 110. Accordingly, in this example environment 100, the user 140 has a trajectory 141 that is particularly approaching the front driver-side door 111 of the vehicle 110. In this embodiment, the user ID device 121 of the trajectory analysis entry control system 120 can perform facial recognition of the user 140 to confirm their identify as the driver, or authorized user, that can be allowed entry into the vehicle 110. In response to successfully identifying the user 140 as the driver, the trajectory tracking device 122 can analyze real-time image data of the user 140, in order to dynamically recognize the trajectory 141, while the user 140 is already moving/walking towards the vehicle 110. Also, the trajectory tracking device 122 further analyzes the trajectory 141 with respect to the vehicle 110 to specifically determine which one of the access points of the vehicle 110, namely doors 111-114 or trunk 115, that the user 140 is approaching.

In response to the trajectory tracking device 122 determining the trajectory 141 that corresponds to user 140, the system 120 can utilize this trajectory information as the basis for executing an automatic entry control function. In this example, because the trajectory tracking device 122 tracks that the user's 140 trajectory 141 is along a path that is particularly approaching the driver-side front door 111 of the vehicle 110, the trajectory analysis entry control system 120 can automatically and remotely unlock and/or open the driver-side door 111, even while the user 140 is still walking towards the vehicle 110. Restated, the trajectory analysis entry control system 120 effectuates an unlocking and/or opening of the driver-side door 111 as an automatic entry control before the user 140 physically arrives at the vehicle 110 (e.g., still walking towards to driver-side door 111). Thus, the disclosed trajectory analysis entry control system 120 accomplishes similar types of automatic entry controls as conventional remote keyless entry, as the user can remain at a distance away from the vehicle, while providing the added convenience of eliminating the need for the user 140 to perform additional actions like press a button on a key fob or grab a door handle.

Referring now to FIG. 2, another example environment 200 including a vehicle 210 that is configured to implement a different embodiment of the trajectory analysis entry control system 220 is depicted. Similarly, to FIG. 1, the example environment 200 also illustrates a user 240 that is walking proximate to the vehicle 210. The structure and capabilities of the vehicle 210 and the trajectory analysis entry control system 220 are substantially similar to those of the system described above in reference to FIG. 1. Thus, for purposes of brevity, the elements, and functions of the trajectory analysis entry control system 220 of FIG. 2 that are similar to those described in FIG. 1 will not be described again in great detail. However, the trajectory analysis entry control system 220 does differ from the system of FIG. 1 by integrating ultra-wideband (UWB) technology into system's 220 configuration and operation. As a general description, the trajectory analysis entry control system 220 leverages UWB technology to implement its user identification and trajectory analysis capabilities (e.g., as opposed to image capturing devices and/or image analysis utilized in the system of FIG. 1). According to this embodiment, the trajectory analysis entry control system 220 has a configuration that includes: a user ID device 221, which includes a UWB receiver 224; a trajectory tracking device 222, which includes a UWB receiver 225; and a lock control device 223.

As referred to herein, UWB describes a type of short-range, high-bandwidth, wireless communication protocol that operates through radio waves. Although UWB has some similarities to other short-range wireless technologies, such as Bluetooth, UWB differs by utilizing high frequencies (e.g., a broad spectrum of GHz frequencies) which can be used to capture highly accurate spatial and directional data. Generally, UWB can be considered to continuously employing high-frequency scanning signals that can precisely lock onto an object, discover its location, and communicate with it. Therefore, due to the aforementioned capabilities, UWB technology is particularly suitable for applications that involve data collection, precision locating, and movement tracking, such as implementing the identification and trajectory tracking functions of the system 220.

In the example environment 200, the user 240 is shown as being located within the vicinity of the vehicle 220. Also, the user 240 is depicted as being in possession of a remote UWB device 230. For example, the UWB device 230 that is utilized by the user 240 can be a portable UWB-enabled device such as a smartphone, smartwatch, smart key, tile, or similar handheld device. Generally, the UWB device 230 can be used as a transmitter for remotely tracking the location/trajectory of the user 240, while having a form-factor and size that is convenient and not cumbersome for the user 240 to possess. Due to the user 240 being nearby the vehicle 210, the UWB device 230 of the user 240 can also be inside of the wireless communication range of the UWB devices 224, 225 of the trajectory analysis entry control system 220. As a result, the UWB device 240 can begin to act as a wireless transmitter/initiator, sending signals across the wide spectrum frequency that are received by the UWB devices 224, 225 which are correspondingly acting as receivers/responders. In an embodiment, the UWB devices 224, 225 can be implemented as hardware (e.g., antennas) and/or circuitry that is embedded in the hardware of the user ID device 221 and the trajectory tracking device 222 respectively. In another embodiment, the UWB devices 224, 225 are implemented as part of the communications electronics and/or circuitry of the vehicle 210.

The UWB device 230 can be configured to transmit identification data that distinctively corresponds to the device (and associated with the user 240 that possess the device 230) such as a personal identification number (PIN) or unique user identifier, to the UWB device 224 of the user ID device 221. This identification data from the UWB device 230, which is received by the UWB device 224, is then analyzed by the user ID device 221 in order to verify that the user 240 is an authorized user of the vehicle 220. As previously described in reference to FIG. 1, the system 220 confirms that the user 240 is identified as a person that has access/entry rights to a vehicle 210, such as the vehicle's owner or another designated driver/operator of the vehicle, prior to executing any automatic entry controls for said vehicle 210. As an example, the user ID device 221 can analyze the identification information obtained via UWB technology by determining whether the received PIN from the UWB device 230 matches a defined PIN for an authorized user of the vehicle 210.

Continuing with the example, if the user ID device 221 verifies that the PIN transmitted from the UWB device 230 is the same as a stored PIN corresponding to the owner of the vehicle 210, then the user 240 is considered to be successfully identified by the system 220 as an authorized user of the vehicle 210. As alluded to above, the identity of the user 240 is verified by the system 220 to ensure security (e.g., unknown persons not allowed access/entry into the vehicle) and to optimize system resources (e.g., trajectory tracking not performed for unknown persons). Additionally, UWB provides enhanced security in comparison to other short-range wireless devices, such as radio-frequency (RF) key FOB, by having a physical layer (PHY) extension (e.g., being specified in IEEE 802.15.4z) that supports security techniques such as cryptography and random number generation that deters attackers from accessing UWB communications. Furthermore, with the enhanced security of UWB, the remote UWB device 230 are less likely to be subject to a "relay attack" as traditional RF key FOB, wherein a detected key FOB radio signal can be captured and relayed in an attempt to steal or gain access to the vehicle.

An advantage of UWB technology is that UWB devices have the capability to calculate the precise location of another UWB device or UWB-enabled object. Although UWB is extremely low power, its high bandwidth (e.g., approximately 500 MHz) capabilities can be ideal for relaying a lot of position/location data, which is needed for precise and real-time location tracking, between devices that are within the UWB wireless communication range (e.g., up to about 30 feet). Restated, UWB-enabled devices have an awareness of both motion and relative position. In this embodiment, the trajectory tracking device 222 leverages these advantages of UWB technology, employing the UWB devices 230, 225 as a means to analyze movement and trajectory of the user 240 with respect the vehicle 210.

As an operational example, when the UWB device 230 is close enough to the vehicle 210 to be within the wireless communication range of the UWB device 225 of the trajectory tracking device 222, the UWB devices 230, 225 start "ranging." Ranging refers to calculating a time of flight (ToF), which is the roundtrip time of challenge/response packets between the UWB devices 230, 225. This UWB-based communication, such as ranging, enables the UWB device 225 to begin a positioning process that allows the UWB device 225 to precisely track the location and the movements of the UWB device 230 that is handled by the user 240 in real-time. In doing so, the UWB device 225 obtains precise data on the motion and relative position of the user 240, which can be further analyzed by the trajectory tracking device 222. Moreover, in accordance with the UWB technology standard, the UWB device 230 is configured to automatically transmit pulse signals every (two nanoseconds each). With this frequency, the UWB device 225 is almost continuously receiving updated location/position data from the UWB device 230, and thereby enables the UWB device 225 to achieve greater accuracy with respect to tracking location/position and movement.

In the example environment 200, the identified user 240 is depicted as being at a location that is proximate to the driver-side front door 211. However, the user 240 is also illustrated as walking away from the vehicle 210. For instance, the user 240 may be a driver that has already reached their destination, and therefore they have parked and exited the vehicle 210. Thus, even though the user 240 is initially at a position that is close to the vehicle 210, they have a trajectory 241 (indicate by dashed arrow) that is moving farther away from the vehicle 210. In this scenario (after the user 240 has been successfully identified as the driver of the vehicle 210 by the user ID device 222), the UWB-enabled trajectory tracking device 225 utilizes its communication with the remote UWB device 230 to leverage the aforementioned UWB location tracking. As the location and movement of the remote UWB device 230 is being actively tracked, the trajectory tracking device 222 can determine an exact location of the user 240 in real-time, and also track their trajectory 241 that is moving from the driver-side front door 211 in an opposite direction from the location of the vehicle 210 (e.g., distance from vehicle increasing), due to the user walking away from the vehicle 210. In response to tracking the trajectory 241 that is moving farther away from the vehicle, the lock control device 223 can trigger an automatic entry control that automatically locks/closes the driver-side front door 211 without the user 240 having to physically touch the door 211 as they are walking away from the vehicle 210. Although FIG. 2 illustrates the example of the system 220 automatically locking a door of the vehicle 210, it should be appreciated that the UWB-enabled trajectory analysis entry control system 220 is capable of executing other automatic entry control functions for the vehicle 210, such as unlocking/opening doors 211-214 and/or trunk 215, by using the UWB-based trajectory tracking capabilities as disclosed herein.

In FIG. 3, another example environment 300 including a vehicle 310 that is configured to implement a different embodiment of the trajectory analysis entry control system 320 is depicted. According to the embodiment of FIG. 3, the trajectory analysis entry control system 320 utilizes ML-based analysis in order to implement the trajectory tracking capabilities of the system 320. Similar to FIG. 1, the example environment 300 also illustrates a user 340 that is walking proximate to the vehicle 310. However, in this environment 300, the user 340 is located nearest to the rear of the vehicle 310, specifically the trunk 315. The structure and capabilities of the vehicle 310 and the trajectory analysis entry control system 320 are substantially similar to those of the system described above in reference to FIG. 1. Thus, for purposes of brevity, the elements, and functions of the trajectory analysis entry control system 320 of FIG. 3 that are similar to those described in FIG. 1 will not be described again in great detail. However, the trajectory analysis entry control system 320 does differ from the system of FIG. 1 by integrating ML technology into system's 320 configuration and operation. As seen in FIG. 3, the trajectory analysis entry control system 320 leverages AI/ML technology to implement its trajectory analysis capabilities (e.g., as opposed to image capturing devices and/or image analysis utilized in the system of FIG. 1). Furthermore, FIG. 3 illustrates utilizing a remote key FOB device 330 to implement the user identification capabilities (e.g., as opposed to image capturing devices and/or image analysis utilized in the system of FIG. 1). As seen in the example of FIG. 3, the trajectory analysis entry control system 320 has a configuration that includes: a user ID device 321, which includes a key FOB receiver 324; a trajectory tracking device 322, which includes a trajectory ML model 325; and a lock control device 323.

As referred to herein, machine learning (ML) describes a type of artificial intelligence (AI) that allows computer applications to become more accurate at predicting outcomes without being explicitly programmed to do so. For example, ML algorithms utilize data analysis that employs historical data as input to automate analytical model building to predict new output values. Generally, the trajectory ML model 325 can learn from historical data that is related to users' position and movement/trajectory, identify patterns, and make decisions to predict a trajectory (with respect to the vehicle) of users with minimal human intervention.

According to an embodiment, the trajectory ML model 325 is generated by training the model 325 over time with historical data that may be obtained in previously performed trajectory analysis functions. As an example, the trajectory ML model 325 may continuously re-train/tune itself by obtaining and analyzing the data that was derived as the system 320 executed trajectory tracking for the user 340 over a time period of days, week, months, or years. Thus, in the example environment 300, the trajectory ML model 325 has already been trained and generated using historical data pertaining to tracking the movement/trajectory of the user 340 in the past and modeling a pattern. As a result, any current location and/or movement data for the user 340 that is obtained by the trajectory tracking device 322 can be applied to the trajectory ML model 325 in order to predict the trajectory 341 of the user 340.

According to an embodiment, the trajectory ML model 325 includes AI/ML algorithm(s) and/or model(s) to predictively map an output, namely a predicted trajectory to the received input of real-time data. For example, real-time data from the communication points in system 320, such as the key FOB receiver 324 and/or other vehicle sensors, can be fed as input into the trajectory ML model 325. Accordingly, the trajectory ML model 325 can have a robust data set that can be utilized for its prediction modeling techniques. As a general description, the trajectory ML model 325 can function as a closed-feedback loop, continuously iterating the steps of: real-time location data monitoring for a user; predicting a trajectory for user with respect to a vehicle; and re-training/optimization. Moreover, the algorithm(s) and/or model(s) of the trajectory ML model 325 can be implemented as an ML-based processes that trains itself from the multiple data sets and improves over time (without human intervention). As an example, a model for trajectory prediction can use equations that express a relationship between position and/or movement of the user the location of the vehicle; and further evaluates the predicted trajectories over time. Various prediction models can be used by the trajectory ML model 325, where variables such as location, position, orientation, direction, angle, etc. can be injected into the model to generate real-time estimates for predicting a trajectory expressing the user's movement with respect to the vehicle. Furthermore, the trajectory ML model 325 can be generated per user, per vehicle, per a group of associated users, a group of associated vehicles.

As seen in FIG. 3, the trajectory ML model 325 can be implemented on the hardware of the trajectory tracking device 322. For example, the trajectory ML model 325 can be any one or a combination of hardware, circuitry, software, firmware, that executes the AI/ML algorithms and AI/ML modeling necessary to generate an ML-based prediction of trajectory from learned user behavior. A prediction result can be output from the trajectory ML model 325 and further analyzed by the processing resources of the trajectory tracking device 322 in order to ultimately trigger an automatic entry function of the system 320 that is based on the predicted trajectory 341 of the user 340.

In the example environment 300, the identified user 340 is depicted as being at a location that is proximate to the trunk 315. Additionally, the user 340 is also illustrated as walking towards the vehicle 310, particularly the trunk 315. In other words, the user 340 has a trajectory 341 (indicate by dashed arrow) that is moving closer towards the rear, or the trunk 315, of the vehicle 310. In this scenario, the user 340 can be successfully identified as an authorized user, for example the driver of the vehicle 310, by being in possession of the remote key FOB 330. The remote key FOB 330 can be operate in a manner that is consistent with an industry standard, being distinctly configured to automatically communicate via radio frequencies (RF) with the key FOB receiver 324 when they are within defined range of each other (e.g., approximately within 65 feet), where it can be subsequently identified as the corresponding key for the particular vehicle, namely vehicle 310. Further, the location and movement of the user 340 is being actively tracked in real-time by the vehicle 310, for instance from signals transmitted by the remote key FOB 330.

This data that is collected in real-time and represents the current position and/or movement of the user 340, can be analyzed by the trajectory tracking device 322. Particularly, according to this embodiment, the obtained real-time data is applied to the trajectory ML model 325, wherein an ML-based analysis is performed to automatically generate a predicted trajectory 341 based on a learned trend of the user's trajectory over time. For example, the trajectory ML model 325 can have historical data corresponding to the identified user 340 which models that in the past, if the user 340 is within 5 feet of the trunk 315, then the user 340 tends to have a trending trajectory that continues all the way to the trunk 315 for them to open. As a result, based on analyzing the real-time location data of the user 340, for instance indicating that the user 340 is currently less than 5 feet from the trunk 315, the trajectory ML model 325 can output a predicted trajectory 341, which predicts that the user 340 is currently moving in a direction closer towards rear of the vehicle 310 (e.g., distance from vehicle decreasing), and approaching the trunk 315. In response to this predicted trajectory 341 that is moving closer to the trunk 315, the lock control device 323 can trigger an automatic and remote entry control that automatically unlocks/opens the trunk 315.

Thus, the trajectory analysis entry access system 320 can remotely unlock/open based on the ML predicted trajectory 314 and while the user 340 is still at a distance away from the trunk 315, without the user 240 having to physically press a button on the remote key FOB 330, and without requiring the user 340 be close enough to the vehicle 310 to perform an additional action, like making a foot gesture under the rear bumper. Although FIG. 3 illustrates the example of the system 320 automatically unlocking/opening the trunk 315 to the vehicle 310, it should be appreciated that the ML-enabled trajectory analysis entry control system 320 is capable of executing other automatic entry control functions for the vehicle 310, such as unlocking/opening doors 311-314, by using the ML-based trajectory tracking capabilities as disclosed herein.

Figure 4:
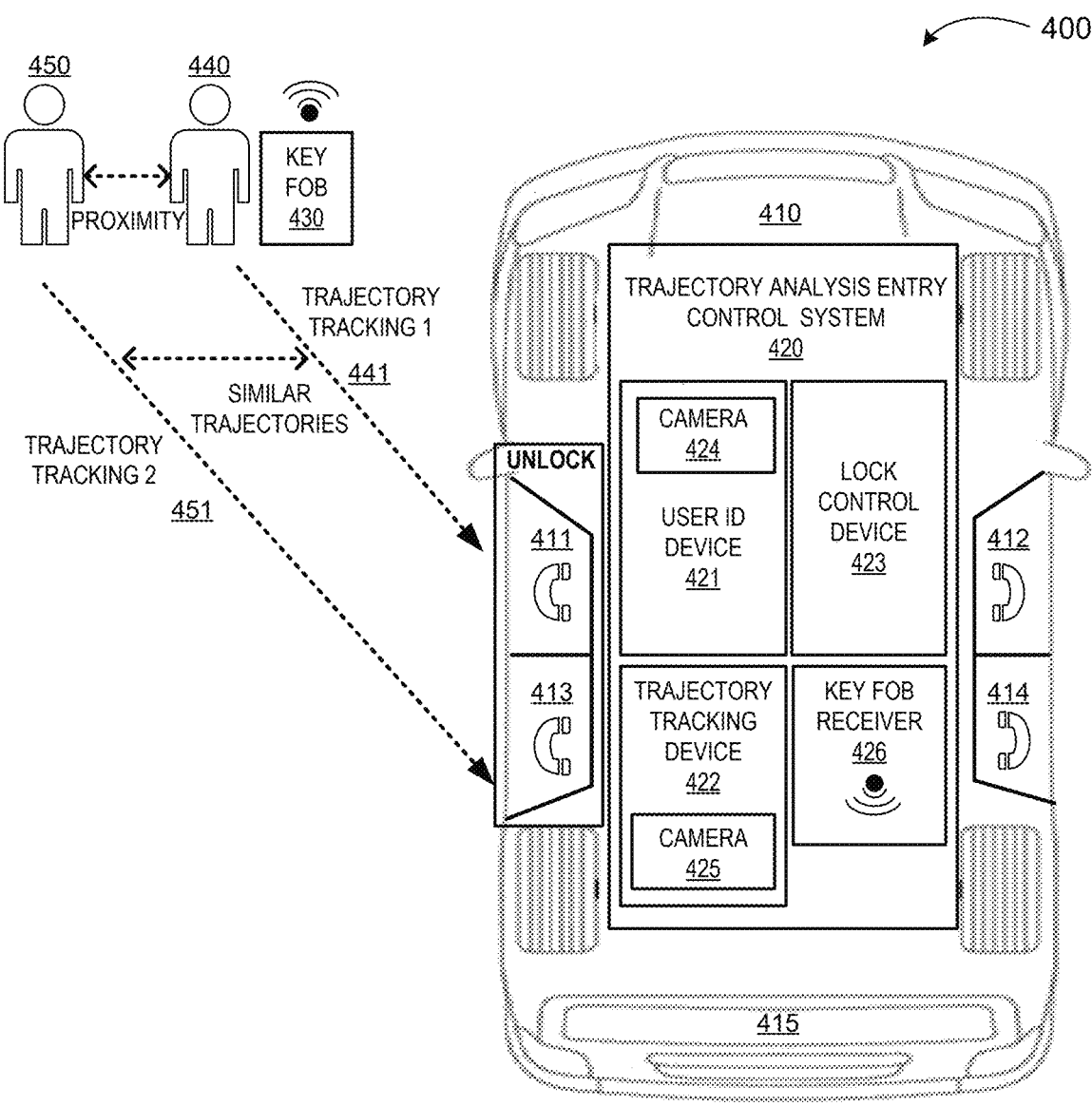
FIG. 4 is an example configuration of a trajectory analysis entry control system, implementing automatic passenger entry controls, which is utilized in a vehicle, in accordance with an embodiment of the technology disclosed herein.

In FIG. 4, yet another example environment 400 including a vehicle 410 that is configured to implement an embodiment of the trajectory analysis entry control system 420 is depicted. In the example of FIG. 4, the trajectory analysis entry control system 420 is configured to recognize and analyze trajectories of multiple users, referred to herein as a "vehicle passenger" feature. As a general description, the trajectory analysis entry control system 420 can determine if two or more users have a defined association with respect to a vehicle, such as a driver and a passenger for the vehicle 410, that is based on their detected proximity (to each other) and trajectories. For example, if the system 420 identifies at least one person from among a group of people as an authorized user of the vehicle, such as the driver/operator; and if are all of the people in the group are proximate to the identified user and have similar trajectories as the identified user; then the system 420 identifies the other people in the group as passengers of that vehicle (e.g., associated with the driver) and will automatically and remotely enable entry/access to the vehicle 410, for instance unlocking/opening doors 411-414 or trunk 415, for everyone in the group (e.g., driver and passengers) simultaneously.

In an embodiment, the trajectory tracking device 422 utilizes defined thresholds to satisfy a first "proximity association" parameter and a second "trajectory association" parameter. That is, if the detected proximity between users is less than the defined threshold for proximity, then the users are considered proximately close to each other. This closeness in proximity indicates that there is a likelihood that the users are associated with each other, and the other users may be passengers of the vehicle. In an example, a threshold for proximity can be defined as a set value ranging between 1 ft.-10 ft. Thus, when a detected proximity between users is less than defined threshold, then the users are deemed to successfully satisfy the "proximity association" parameter. Similarly, if the detected trajectory for each user has a deviation that is less than the defined threshold for trajectory, then the users are considered to have similar trajectories. Substantially similar trajectories indicate a likelihood that the users are associated with each other, such as a driver and passengers of the same vehicle, as evidenced by the users walking in similar paths/trajectories to the same vehicle. In an example, a threshold for trajectory can be defined as a set deviation value ranging between 1%-10% deviation between trajectories. Thus, when trajectories for each of the users are compared to each other and have deviations that are less than the defined threshold, then the users are deemed to successfully satisfy the "threshold association" parameter. For instance, if a trajectory of a driver and a trajectory of a potential passenger have a deviation in angle, orientation, and direction that is less than 5%, then these trajectories would be deemed as substantially similar when the trajectory threshold is set to 10% deviation.

In the described example of FIG. 4, both the "proximity association" parameter and the "trajectory association" parameters must be successfully satisfied in order for the system 420 to ultimately determine that the users have an association for the purposes of triggering the automatic "vehicle passenger" entry controls. However, it should be appreciated that in an embodiment, the automatic "vehicle passenger" entry controls can be effectuated by either one of the "proximity association" parameter or the "trajectory association" parameter singularly or in combination with another parameter related to the users' location and/or movement that is not expressly described herein.

Similar to FIG. 1, the trajectory analysis entry control system 420 of FIG. 4 is shown in a configuration that implements image analysis and/or imaging technology for the user identification and trajectory tracking capabilities. For instance, the user ID device 421 includes camera 424, and the trajectory tracking device 422 includes camera 425. Nonetheless, the example configuration in FIG. 4 is not intended to be limiting, and the vehicle passenger features described herein in reference to FIG. 4 can be accomplished utilizing any one or a combination of the previously described embodiments of FIG. 1-FIG. 3. The structure and capabilities of the vehicle 410 and the trajectory analysis entry control system 420 are substantially similar to those of the system described above in reference to FIG. 1. Thus, for purposes of brevity, the elements, and functions of the trajectory analysis entry control system 420 of FIG. 4 that are similar to those described in FIG. 1 will not be described again in great detail.

In the example environment 400, two users 440, 450 are depicted as being together in a general location that is proximate to the vehicle 410. For instance, the user 450 may be a driver of the vehicle 410, shown as the user that is in possession of the remote key FOB 430 for the vehicle 410. Additionally, user 450 may be a friend of the driver, namely user 440, and they may have traveled together to a destination as driver and passenger in the vehicle 410. Thus, the users 440 and 450 have already established a contextual association, or relationship, to one another with respect to the vehicle (as driver and passenger), where it would be safe to assume that access/entry to the vehicle 410 should be permitted for both users 440, 450.

Continuing with this example, when leaving the destination and returning back to their vehicle 410, it would be common for the users 440, 450 to also walk towards the vehicle 410 together so that they can enter the vehicle 410 simultaneously as driver and passenger. For example, the driver, shown as user 440, may be waking in a path to enter the vehicle 410 through the driver-side front door 411 to sit in the driver's seat. The passenger, shown as user 450, may be walking in a path to enter the vehicle 410 through the driver-side rear door 413, and at the same time as the driver, to sit in a passenger seat. This driver-passenger scenario is illustrated in FIG. 4, as the user 440 has a trajectory 441 (indicate by dashed arrow) that is moving closer towards the driver-side front door 411 of the vehicle 410, and the user 450 has a trajectory 451 (indicate by dashed arrow) that is moving closer towards the driver-side rear door 413 of the vehicle 410.

In the example of FIG. 4, the user 440 can be successfully identified as an authorized user, for example the driver of the vehicle 410, by being in possession of the remote key FOB 430. In addition, or in lieu of utilizing the remote key FOB 430, the user ID device 421 may utilize the camera 424 and the facial recognition techniques described in reference to FIG. 1 in order identify the user 440 as an authorized user of the vehicle 410, namely a driver/operator.

Furthermore, the trajectory analysis entry control system 420 can detect the presence of the other user 450, for example by utilizing the camera 424 and facial recognition functions of the user ID device 421, within the vicinity of the identified user 440. As an example, facial recognition can be used to determine that another object which is detected in the digital images along with the identified user 440 is indeed another human/person, and not an inanimate object. In response to another person initially being detected nearby the user 440, additional analysis can be performed in order to determine whether their proximity to each other is within a defined proximity threshold to satisfy a first "proximity association" parameter.

Continuing with the operational example of FIG. 4, the camera 425 of the trajectory tracking device 422 may analyze multiple digital images of the users 440, 450 to determine a proximity. For instance, a distance between the initial positions of users 440, 450 can be detected as approximately 8 ft as a result of image analysis. In the case where the proximity threshold for the system 420 is set to 10 ft., then the detected proximity of 8 ft. between the users 440, 450 is comparatively less than the defined proximity threshold. Thus, in response to the detected proximity being less than the defined proximity threshold, then the trajectory tracking device 422 can determine that the users 440, 450 have successfully satisfied the "proximity association" parameter. In other words, the users 440, 450 are located close enough to each other, that there is a high likelihood that user 450 is a passenger of the vehicle 410.

In addition, the camera 425 of the trajectory tracking device 422 may analyze multiple digital images of the users 440, 450 to respectively determine their corresponding trajectories 441, 451. As seen in FIG. 4, both of the users 440, 450 are depicted as walking towards the vehicle 410. In detail, user 440 has a trajectory 441 (indicated by dashed arrow) that is moving particularly towards the driver-side front door 411, and the user 450 has a trajectory 451 (indicate by dashed arrow) that is moving particularly towards the driver-side rear door 413. The trajectory tracking device 422 can determine each of the trajectories 441, 451 with respect to the vehicle 410 utilizing similar image analysis and movement analysis techniques described above in reference to FIG. 1. Generally speaking, both of the trajectories 441, 451 are illustrated to have similar angles, orientations, and directions, as both users 440, 450 are walking from similar starting positions (e.g., close proximity), and sharing progressive movement in similar manners, and taking similar paths towards the same area of the vehicle 410 (e.g., left, driver-side of the vehicle 410).

In the example, the trajectory threshold for the system 420 is set to 10% deviation. It can be assumed by the trajectories 441, 451 being depicted as substantially similar in FIG. 4, that the tracked trajectories 441, 451 for the users 440, 450 respectively, will have a deviation when compared to each other that is less than the defined threshold. Thus, in response to the detected trajectories 441, 451 differing less than the defined trajectory threshold, then the trajectory tracking device 422 can determine that the users 440, 450 have quantifiably similar trajectories and have successfully satisfied the "trajectory association" parameter. Even further, because the system 420 determined that the users 440, 450 have satisfied both the of the "proximity association" and the "trajectory association" parameters, then the users 440, 450 are deemed as being quantifiably associated with each.

By calculating data that reinforces an assumed contextual relationship between the behavior of a driver and passengers (e.g., walking next to each other towards the same general area of the same vehicle), then the system 420 can leverage this information to perform automatic entry control functions that are more suitable for a driver and their passengers (as opposed to just one user). Restated, since the users 440, 450 have trajectories that are substantially similar, meaning they are moving along the same path together and in close proximity to each other, there is a high likelihood that user 450 is associated with user 440 as a passenger of the vehicle 410. Because the system 420 can automatically detect that there is a passenger present, namely using proximity and trajectory analysis to determine the association between users 440,450, in response the system 420 can trigger automatically and remotely unlocking/opening an appropriate door of the vehicle 410 for the driver, or user 440, and simultaneously automatically and remotely unlocking/opening an appropriate door of the vehicle 410 for the passenger, or user 450.

As previously described, the trajectory tracking device 422 has the capability to further analyze a user's trajectory to estimate which of the doors 411-414 or trunk 415 that the user is approaching, and thus determines specifically which one of the doors 411-414, or trunk 415 that will be unlocked/opened for the user. Accordingly, in the example of FIG. 4, the system 420 automatically unlocks/opens the driver-side front door 411 based on the trajectory 441 of user 440, and automatically unlocks/opens the driver-side rear door 413 based on the trajectory 441 of user 450. In an embodiment, the system 420 will unlock/open all of the doors 411-414 of the vehicle 410, when it is estimated that multiple users are approaching multiple doors based on observing their trajectories. Consequently, the "vehicle passenger" capabilities provide the increased convenience of a passenger-triggering remote entry control for the vehicle 420. Because the system 420 performs automatic entry control functions based on trajectory analysis (e.g., the identified driver and passenger(s) are approaching the vehicle 410), the passenger's movement can trigger remote unlocking/opening of the doors 411-414, without any additional input from the driver. For instance, with the disclosed "vehicle passenger" features, the passengers do not have to wait for the driver to physically reach the vehicle to unlock the doors for them, or even wait for the driver to press buttons on the remote key FOB 430 to open the doors for them.

Although FIG. 4 illustrates the example of the system 420 automatically unlocking/opening the doors 411, 413 of the vehicle 410, it should be appreciated that the described "vehicle passenger" features of the analysis entry control system 420 is capable of executing other automatic entry control functions for the vehicle 410, such as locking/closing doors 411-414 (as described in reference to FIG. 2) and/or unlocking/opening the trunk 415 (as described in reference to FIG. 3), as disclosed herein. Moreover, in an embodiment, detecting multiple users nearby the vehicle 410 can be utilized as an additional security check enabled by the system 420. For example, if a number of people detected near the vehicle exceeds a threshold, then the system 420 may either wait for a defined time period (e.g., 30 seconds) or wait for the driver/operator to get within close proximity of the vehicle (e.g., 1-2 meters) before unlocking/opening one of the doors 411-414 or trunk 415 is actually executed.

Figure 5:
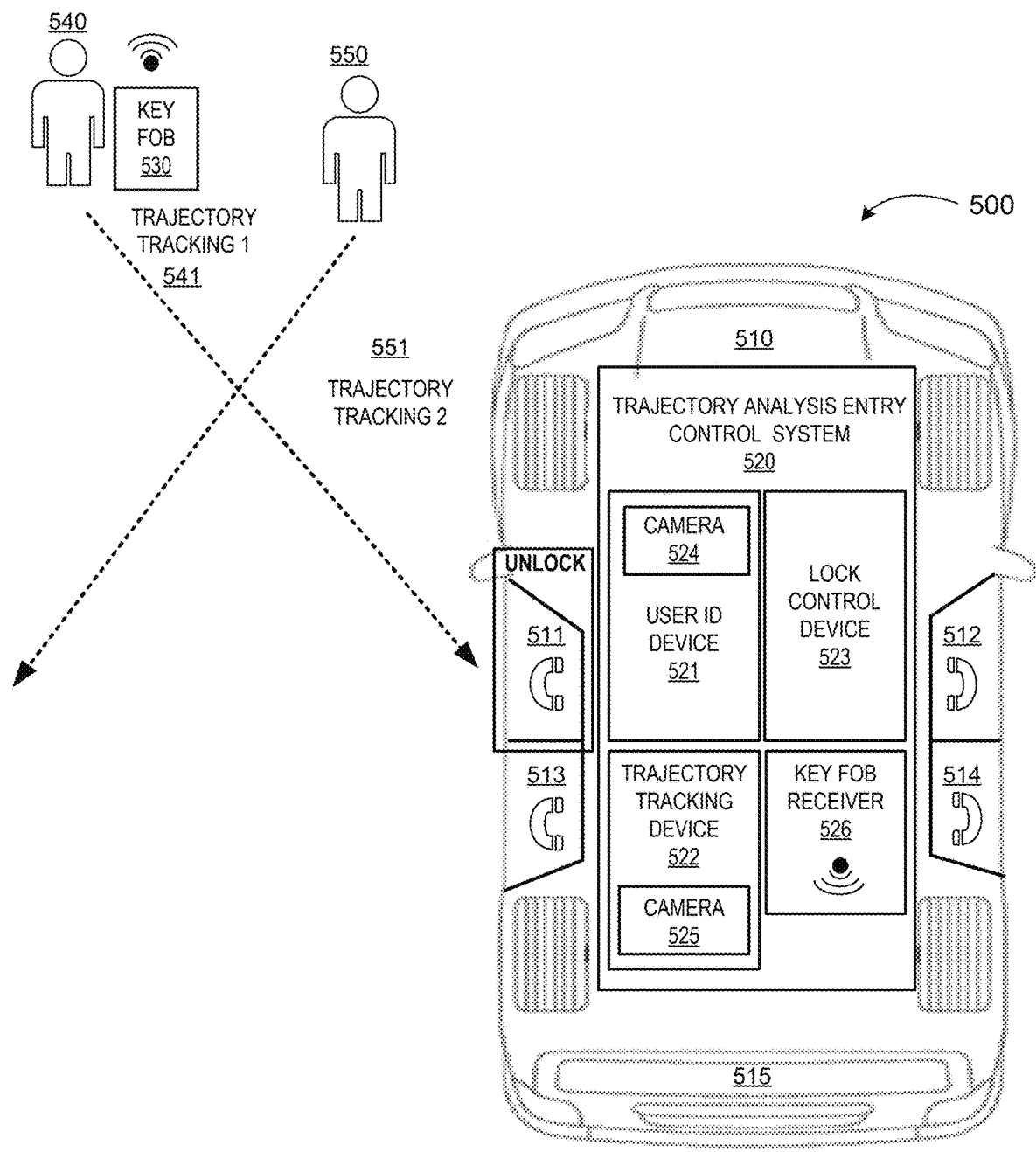
FIG. 5 is another example configuration of a trajectory analysis entry control system, implementing automatic passenger entry controls, which is utilized in a vehicle, in accordance with an embodiment of the technology disclosed herein.

Referring now to FIG. 5, another example environment 500 including a vehicle 510 with the disclosed trajectory analysis entry control system 520 is depicted, where the system 520 is configured to implement the "vehicle passenger" capabilities described above. The structure and capabilities of the vehicle 510 and the trajectory analysis entry control system 520 are substantially similar to those of the system described above in reference to FIG. 4. Thus, for purposes of brevity, the elements, and functions of the trajectory analysis entry control system 520 of FIG. 5 that are similar to those described in FIG. 4 will not be described again in great detail. However, in contrast to the example of FIG. 4 where the system determines associated users (e.g., driver and passenger), FIG. 5 illustrates a specific example environment 500 where the system 520 may determine that the users 540, 550 are not associated with each other (e.g., driver and an unidentified person), based on an analysis of their proximity and trajectories. Consequently, as the user 550 cannot be recognized as a passenger by the system 520, then the system 520 does not perform an automatic entry control function, such as unlocking/opening one of the doors 511-514 or trunk 515, for this person that is seemingly a stranger passing by that is not intended to have access to the vehicle 510.

In this scenario, the system 520 can identify the user 540, who is depicted as walking towards the vehicle 510, as the driver/operator. For example, because the user 540 is in possession of the remote key FOB 530 and is at a location that is generally proximate to the vehicle 510, the user ID device 521 can successfully identify them as a user that is defined as having authorized access/entry to the vehicle 510. Additionally, a second user 550 is shown to also be in the vicinity of the vehicle 510 at the same time as the identified user 540. Furthermore, because the users 540, 550 are relatively close to each other, the system 520 may initially determine that the users 540, 550 have close enough proximity to satisfy the defined "proximity association" parameter. Nonetheless, as seen in FIG. 5, the user 540, or the driver, is walking in a direction towards the vehicle 510, while the user 550 is walking in the opposite direction, moving farther away from the vehicle 510. For instance, although the user 540, namely the drive, intends to enter into their vehicle 510, the user 550 is a person having no relationship with the driver or the vehicle 510 that happens to be walking past by the vehicle 510 at the same time the driver is approaching, but has no intention of entering the vehicle 510 (and is not authorized to enter the vehicle 510). As the trajectory tracking device 522 performs analysis to determine whether the users 540, 550 satisfy the "trajectory association" parameter, it will detect a substantially large deviation between the detected trajectory 541 of the user 540 that is approaching the vehicle 510, and the trajectory 551 of the user 550 that is walking by the vehicle 510. That is, although both users 540,550 are initially positioned generally close to the vehicle 510, the trajectory 541 has a direction (e.g., right) that is moving closer towards the vehicle, while the trajectory 551 has an opposing direction (e.g., left) that is progressing farther away from the vehicle. Accordingly, this large of a deviation between the trajectories 541, 551 would not be deemed to satisfy the "trajectory associated" parameter (e.g., trajectories are dissimilar), and as a result the system 520 would determine that there is no association between the users 540, 550.

In response, because the user 550 is likely not a passenger (e.g., has no quantifiable association with the vehicle 510 or the user 540) the system 520 can deem that the user 550 is an undefined person and/or a user that is not authorized to access/enter the vehicle 510. In an embodiment, when the system 520 detects a "no association" scenario as illustrated in FIG. 5, the system 520 is configured to open/unlock the corresponding door 511 that the identified user 540 is approaching. However, the system 520 does not execute any additional automatic entry control function for a passenger since the user 550 failed to be recognized as a passenger for the vehicle 510. For instance, none of the remaining doors 512-514 or trunk 515 would be unlocked/opened, so as ensure that the unidentified user 550 is not permitted access to the vehicle 510. Alternatively, in an embodiment, the system 520 may forgo or delay unlocking/opening the door 511 for the identified user 550, because an unidentified user 540 (e.g., person having no association to the driver of the vehicle) is detected as being proximate to the vehicle 510 at the time, as a safety precaution.

Figure 6:
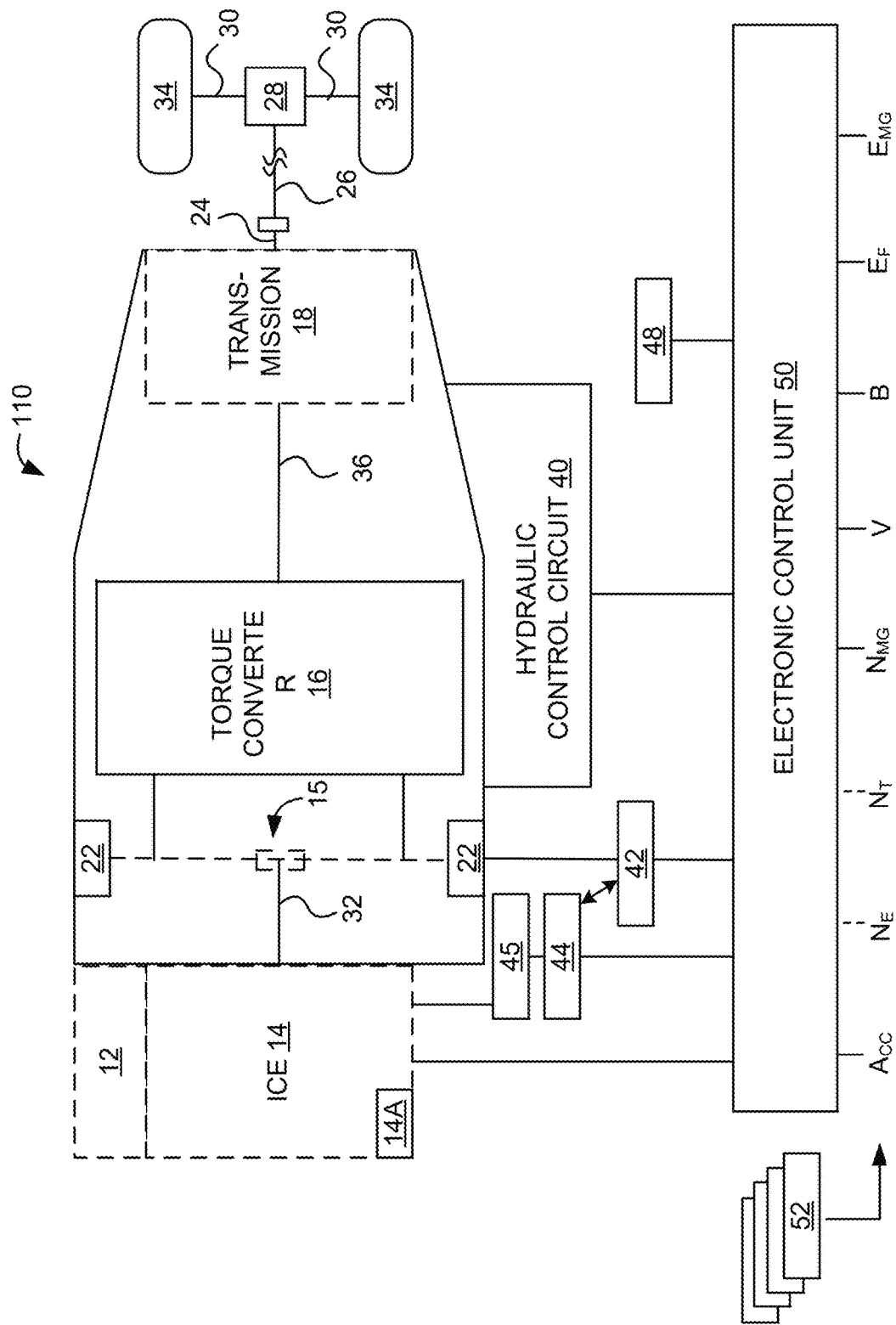
FIG. 6 is a schematic representation of an example vehicle with which embodiments of the steering wheel locking control system disclosed herein may be implemented.

FIG. 6 illustrates a drive system of a vehicle 110 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

Vehicle 110 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be a hybrid electric vehicle (HEV) travel mode that uses engine 14 and the motor(s) 22 as the sources of motive power. In the engine-only and HEV travel modes, vehicle 110 relies on the motive force generated at least by internal combustion engine 14, and a clutch 15 may be included to engage engine 14. In the EV travel mode, vehicle 110 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump, and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 110 and is powered electrically via a battery 44. Battery 44 may be implemented as one or more batteries or other power storage devices including, for example, lead-acid batteries, lithium-ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium-ion batteries, lead acid batteries, nickel cadmium batteries, lithium-ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 110 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS, ESC, or regenerative braking system), battery management systems, and so on. These various control units can be implemented using two or more separate electronic control units or using a single electronic control unit.

In the example illustrated in FIG. 6, electronic control unit 50 receives information from a plurality of sensors included in vehicle 110. For example, electronic control unit 50 may receive signals that indicate vehicle operating conditions or characteristics, or signals that can be used to derive vehicle operating conditions or characteristics. These may include, but are not limited to accelerator operation amount, ACC, a revolution speed, NE, of internal combustion engine 14 (engine RPM), a rotational speed, NMG, of the motor 22 (motor rotational speed), and vehicle speed, NV. These may also include torque converter 16 output, NT (e.g., output amps indicative of motor output), brake operation amount/pressure, B, battery SOC (i.e., the charged amount for battery 44 detected by an SOC sensor). Accordingly, vehicle 120 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, EF, motor efficiency, EMG, hybrid (internal combustion engine 14+MG 12) efficiency, acceleration, ACC, etc.

Additionally, the one or more sensors 52 can be configured to detect, and/or sense position and orientation changes of the vehicle 110, such as, for example, based on inertial acceleration. In one or more arrangements, the electronic control unit 50 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, the electronic control unit 50 receives signals from a speedometer to determine a current speed of the vehicle 110.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output. Additionally, as alluded to above, the one or more sensors 52 can be configured to detect, and/or sense in real-time. As used herein, the term "real-time" means a level of processing responsiveness that a user or system senses as sufficiently immediate for a particular process or determination to be made, or that enables the processor to keep up with some external process.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 110 and/or information/data about such objects. Such objects can be stationary objects and/or dynamic objects. Further, the sensors can be configured to detect, measure, quantify and/or sense other things in the external environment of the vehicle 110, such as, for example, lane markers, signs, traffic lights, traffic signs, lane lines, crosswalks, curbs proximate the vehicle 110, off-road objects, etc.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 110 and/or information/data about such objects.

Such objects can be stationary objects and/or dynamic objects. Further, the sensors can be configured to detect, measure, quantify and/or sense other things in the external environment of the vehicle 110, such as, for example, lane markers, signs, traffic lights, traffic signs, lane lines, crosswalks, curbs proximate the vehicle 110, off-road objects, etc.

Figure 7:
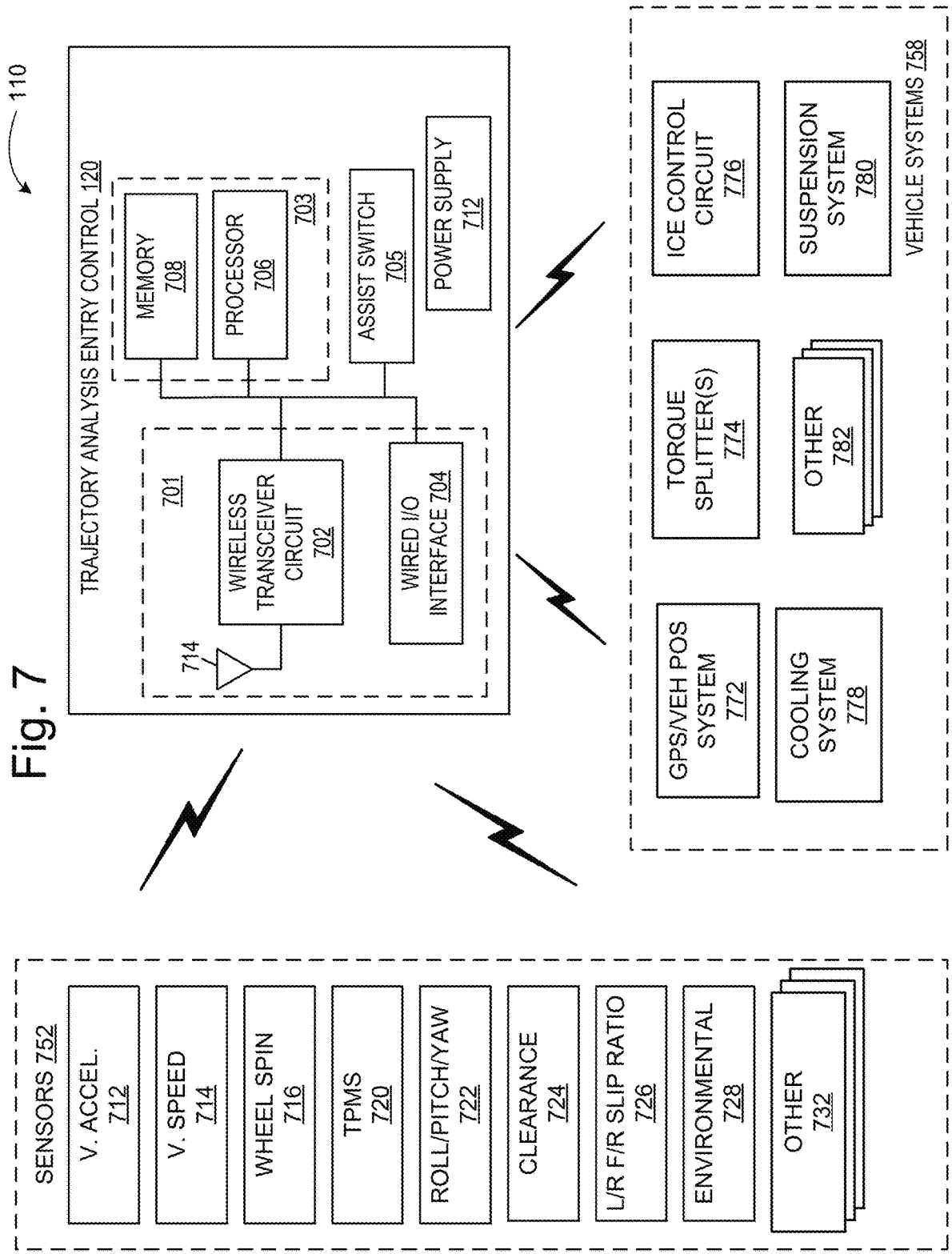
FIG. 7 illustrates an example communication architecture of the vehicle shown in FIG. 1, in accordance with an embodiment of the technology disclosed herein.

Although the example of FIG. 7 is illustrated using processor and memory circuitry, as described below with reference to circuits disclosed herein, trajectory analysis entry control controller 120 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up the trajectory analysis entry control controller 120.

Communication circuit 701 either or both a wireless transceiver circuit 702 with an associated antenna 714 and a wired I/O interface 704 with an associated hardwired data port (not illustrated). As this example illustrates, communications with the trajectory analysis entry control controller 120 can include either or both wired and wireless communications circuits 701. In some embodiments, the communication circuit 401 may implement the IR wireless communications from the vehicle to a hydrogen fueling station. Wireless transceiver circuit 702 can include a transmitter and a receiver (not shown) to allow wireless communications via any of a number of communication protocols such as, for example, WiFi, Bluetooth, near field communications (NFC), Zigbee, IrDA, and any of a number of other wireless communication protocols whether standardized, proprietary, open, point-to-point, networked or otherwise. Antenna 714 is coupled to wireless transceiver circuit 702 and is used by wireless transceiver circuit 702 to transmit radio signals wirelessly to wireless equipment with which it is connected and to receive radio signals as well. These RF signals can include information of almost any sort that is sent or received by trajectory analysis entry control controller 120 to/from other entities such as sensors 752 and vehicle systems 758.

Wired I/O interface 704 can include a transmitter and a receiver (not shown) for hardwired communications with other devices. For example, wired I/O interface 704 can provide a hardwired interface to other components, including sensors 752 and vehicle systems 758. Wired I/O interface 704 can communicate with other devices using Ethernet or any of a number of other wired communication protocols whether standardized, proprietary, open, point-to-point, networked or otherwise.

Power supply 712 can include one or more of a battery or batteries (such as, e.g., Li-ion, Li-Polymer, NiMH, NiCd, NiZn, and NiH2, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 752 can include, for example, sensors 752 such as those described above with reference to the example of FIG. 1. Sensors 752 can include additional sensors that may or not otherwise be included on a standard vehicle with which the steering wheel rotation locking system is implemented. In the illustrated example, sensors 752 include vehicle acceleration sensors 712, vehicle speed sensors 714, wheelspin sensors 416 (e.g., one for each wheel), a tire pressure monitoring system (TPMS) 720, accelerometers such as a 3-axis accelerometer 722 to detect roll, pitch and yaw of the vehicle, vehicle clearance sensors 724, left-right and front-rear slip ratio sensors 726, and environmental sensors 728 (e.g., to detect salinity or other environmental conditions). Additional sensors 732 can also be included as may be appropriate for a given implementation.

Vehicle systems 758 can include any of a number of different vehicle components or subsystems used to control or monitor various aspects of the vehicle and its performance. In this example, the vehicle systems 758 include a GPS or other vehicle positioning system 772; torque splitters 774 they can control distribution of power among the vehicle wheels such as, for example, by controlling front/rear and left/right torque split; engine control circuits 776 to control the operation of engine (e.g. Internal combustion engine 14); cooling systems 778 to provide cooling for the motors, power electronics, the engine, or other vehicle systems; suspension system 780 such as, for example, an adjustable-height air suspension system, and other vehicle systems.

During operation, trajectory analysis entry control controller 120 can receive information from various vehicle sensors 752. Also, the driver may manually activate a manual/non-autonomous operation mode (implementing the steering wheel locking capabilities) by operating switch 705. Communication circuit 701 can be used to transmit and receive information between the steering wheel rotation locking controller 729 and sensors 752, and trajectory analysis entry control controller 120 and vehicle systems 758. Also, sensors 752 may communicate with vehicle systems 758 directly or indirectly (e.g., via communication circuit 701 or otherwise).

Figure 8:
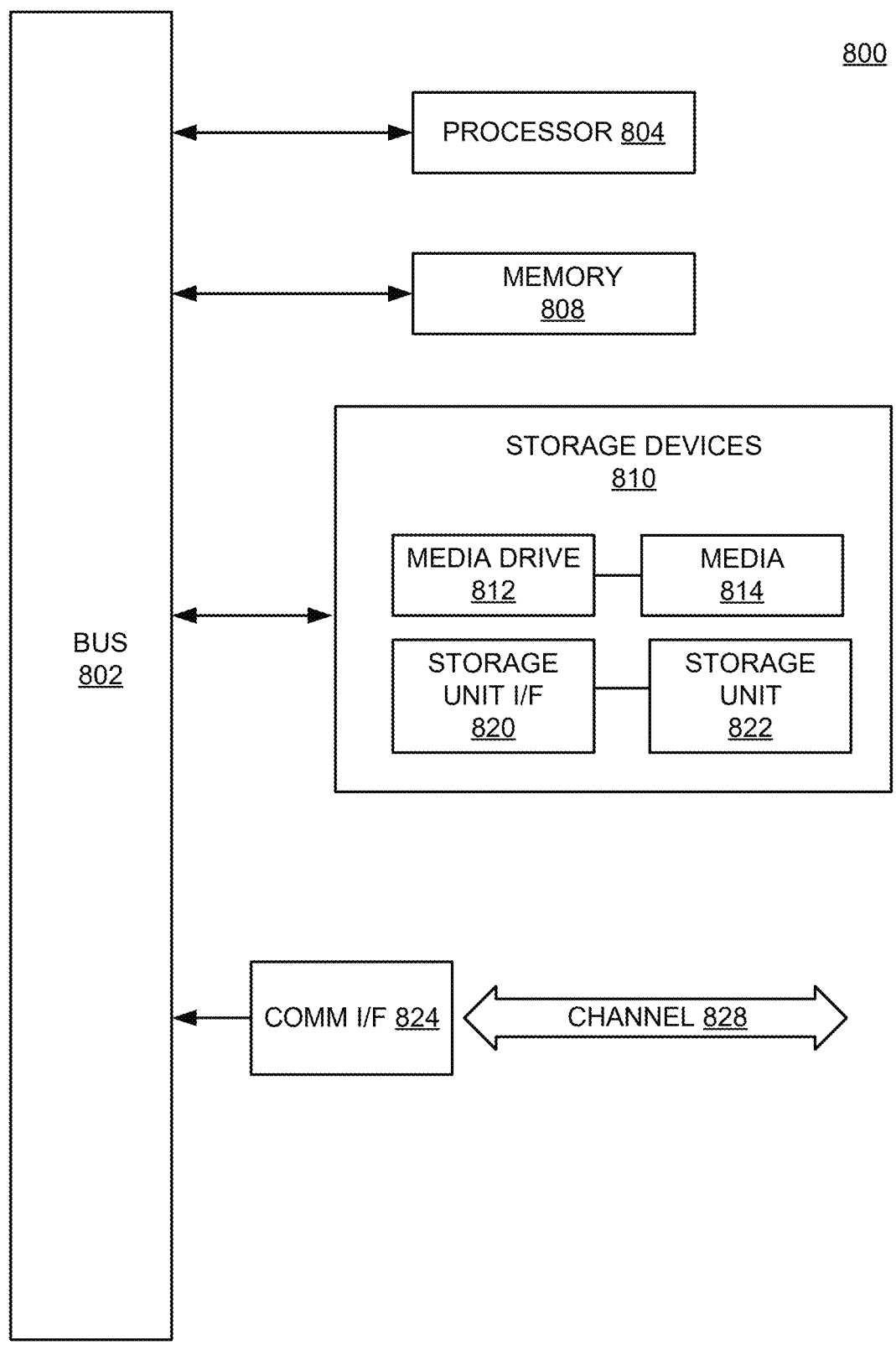
FIG. 8 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 8. Various embodiments are described in terms of this example-computing component 800. After reading this description, it will become apparent to a person skilled in the relevant art how to implement the application using other computing components or architectures.

Referring now to FIG. 8, computing component 800 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, portable computing devices, and other electronic devices that might include some form of processing capability.

Computing component 800 might include, for example, one or more processors, controllers, control components, or other processing devices. This can include a processor 804. Processor 804 might be implemented using a general-purpose or special-purpose processing engine such as, for example, a microprocessor, controller, or other control logic. Processor 804 may be connected to a bus 802. However, any communication medium can be used to facilitate interaction with other components of computing component 800 or to communicate externally.

Computing component 800 might also include one or more memory components, simply referred to herein as main memory 808. For example, random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid-state drive, a magnetic tape drive, an optical drive, a compact disc (CD) or digital video disc (DVD) drive (R or RW), or other removable or fixed media drive might be provided. Storage media 814 might include, for example, a hard disk, an integrated circuit assembly, magnetic tape, cartridge, optical disk, a CD or DVD. Storage media 814 may be any other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 824 might be used to allow software and data to be transferred between computing component 800 and external devices. Examples of communications interface 824 might include a modem or soft modem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 824 may be carried on signals, which can be electronic, electromagnetic (which includes optical) or other signals capable of being exchanged by a given communications interface 824. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
   a user identification device, wherein the user identification device has stored thereon instructions that, when executed by one or more processors, cause the user identification device to:
      identify whether a user within a pre-determined distance range from a vehicle is authorized to access the vehicle; and
      in response to identifying the user as an authorized user of the vehicle, determine whether an additional user is within a second pre-determined distance range from the authorized user; and
   a trajectory tracking device, wherein trajectory tracking device has stored thereon instructions that, when executed by one or more processors, cause the trajectory tracking device to:
      in response to the user identification device identifying the user as an authorized user of the vehicle, determine a trajectory of the authorized user with respect to the vehicle;
      in response to the user identification device determining that the additional user is within the second pre-determined distance range from the authorized user, determine a trajectory of the additional user with respect to the vehicle; and
      in response to determining the trajectory of the authorized user deviates from the trajectory of the additional user by less than a defined deviation value, generate a control signal to automatically unlock one or more access points of the vehicle for the authorized user and the additional user.

2. The system of claim 1, wherein the user identification device comprises an image capturing device.

3. The system of claim 2, wherein the image capturing device obtains a plurality of images of the user used to perform facial recognition for identifying the user.

4. The system of claim 1, wherein the trajectory tracking device comprises an image capturing device.

5. The system of claim 4, wherein the image capturing device obtains a plurality of images of the user that are analyzed to determine the trajectory of the user with respect to the vehicle.

6. The system of claim 1, wherein the user identification device comprises an ultra-wideband (UWB) receiver device.

7. The system of claim 6, wherein the UWB receiver device communicates wirelessly with a remote UWB transmitter device associated with the user to receive identification information for identifying the user.

8. The system of claim 1, wherein the trajectory tracking device comprises an ultra-wideband (UWB) receiver device.

9. The system of claim 8, wherein the UWB receiver device communicates wirelessly with a remote UWB transmitter device associated with the user to receive location and movement information that is analyzed to determine the trajectory of the user with respect to the vehicle.

10. The system of claim 1, wherein the user identification device comprises a key FOB receiver device.

11. The system of claim 10, wherein the key FOB receiver device communicates wirelessly with a remote key FOB transmitter device associated with the user to receive identification information for identifying the user.

12. The system of claim 1, wherein the trajectory tracking device comprises a machine-learning (ML) system.

13. The system of claim 12, wherein the ML system utilizes a ML model of historical data associated with a pattern of movement for the identified user that is analyzed to determine the trajectory of the user with respect to the vehicle.

14. The system of claim 1, wherein the one or more access points of the vehicle comprise at least one of: a front driver-side door, a rear driver-side door, a front passenger-side door, a rear passenger-side door, and a trunk.

15. A system, comprising:
   a user identification device, wherein the user identification device has stored thereon instructions that, when executed by one or more processors, cause the user identification device to:
      identify whether a user within a pre-determined distance range from a vehicle is authorized to access the vehicle; and
      in response to identifying the user as an authorized user of the vehicle, determine whether an additional user is within a second pre-determined distance range from the authorized user; and
   a trajectory tracking device, wherein the trajectory tracking device has stored thereon instructions that, when executed by one or more processors, cause the trajectory tracking device to:
      in response to the user identification device identifying the user as an authorized user of the vehicle, determine a trajectory of the authorized user with respect to the vehicle;
      in response to the user identification device determining that the additional user is within the second pre-determined distance range from the authorized user, determine a trajectory of the additional user with respect to the vehicle;
      determine a proximity distance between the authorized user and the additional user;
      determine whether the authorized user and the additional user are associated with each other by determining whether the proximity distance between the authorized user and the additional user is less than a third pre-defined distance range between users;
      determine whether the trajectory of the authorized user and the trajectory of the additional user satisfies a trajectory association parameter by determining whether a deviation between the trajectory of the authorized user and the trajectory of the additional user is less than a defined deviation value range between trajectories; and in response to determining that the authorized user and the additional user are associated with each other, automatically generate a control signal to automatically unlock access points of the vehicle for the authorized user and the additional user.

16. The system of claim 15, wherein the trajectory tracking device comprises further instructions that, when executed by the one or more processors, cause the trajectory tracking device to:
determine which defined access point of the vehicle from a plurality of defined access points that the trajectory of the authorized user is approaching, wherein each of the plurality of defined access points corresponds to a different section of the vehicle; and
in response to determining which defined access point of the vehicle the trajectory of the authorized user is approaching, automatically generate a control signal to automatically unlock only the determined access point of the vehicle for the authorized user.

17. The system of claim 15, wherein the trajectory tracking device comprises further instructions that, when executed by the one or more processors, cause the trajectory tracking device to:
in response to determining that the proximity distance between the authorized user and the additional user is less than the third pre-defined distance range between users and the deviation between the trajectory of the authorized user and the trajectory of the additional user is less than the defined deviation value range between trajectories, determine that the additional user is associated with the authorized user.

18. The system of claim 17, wherein the trajectory tracking device comprises further instructions that, when executed by the one or more processors, cause the trajectory tracking device to:
determine which defined access point of the vehicle from a plurality of defined access points that the trajectory of the associated user is approaching; and
in response to determining which defined access point of the vehicle the trajectory of the associated user is approaching, automatically generate a control signal to automatically unlock only the determined access point of the vehicle for the associated user.

19. The system of claim 18, wherein the trajectory tracking device comprises further instructions that, when executed by the one or more processors, cause the trajectory tracking device to:
in response to determining that the proximity distance between the authorized user and the additional user is less than the third pre-defined distance range between users or the trajectory association parameter is not satisfied, determine that the additional user is not associated with the authorized user and delay automatically generating the control signal to engage an automatic unlocking of the determined access point of the vehicle for the identified user.

20. A method comprising:
in response to determining an authorized user of a vehicle is within a pre-determined distance of an additional user:
determining, with respect to the vehicle, a trajectory of the authorized user and a trajectory of the additional user; and
in response to determining the trajectory of the authorized user deviates from the trajectory of the additional user by less than a defined deviation value, generating a control signal to automatically unlock one or more access points of the vehicle for the authorized user and the additional user.

\* \* \* \* \*